United States Patent [19]
Johnson

[11] Patent Number: 5,795,423
[45] Date of Patent: Aug. 18, 1998

[54] METHOD FOR MANUFACTURING A FIBER REINFORCED ARTICLE

[75] Inventor: Carl Frederick Johnson, Belleville, Mich.

[73] Assignee: Ford Global Technologies, Inc., Dearborn, Mich.

[21] Appl. No.: 760,843

[22] Filed: Dec. 5, 1996

[51] Int. Cl.⁶ .................................................. B32B 31/00
[52] U.S. Cl. ........................... 156/166; 156/245; 156/310; 428/420
[58] Field of Search ..................... 428/420; 156/310, 156/166, 173, 180, 242, 245

[56] References Cited

U.S. PATENT DOCUMENTS

| | | | |
|---|---|---|---|
| 2,489,145 | 11/1949 | Lieb et al. | 156/310 X |
| 2,557,826 | 6/1951 | Keaton et al. | 156/310 |
| 3,037,900 | 6/1962 | Hings et al. | 156/310 |
| 3,224,920 | 12/1965 | Bosoworth | 156/310 X |
| 3,390,037 | 6/1968 | Christie | 156/310 X |
| 4,907,527 | 3/1990 | Hilakas | 118/67 |
| 5,039,783 | 8/1991 | Brunell et al. | |
| 5,207,850 | 5/1993 | Parekh | 156/166 |

FOREIGN PATENT DOCUMENTS 62-33626  2/1987  Japan .................... 156/173

*Primary Examiner*—Jeff H. Aftergut
*Attorney, Agent, or Firm*—Damian Porcari

[57] ABSTRACT

A method of manufacturing a fiber reinforced article. A first fiber reinforcing layer is impregnated with an initiator. A second fiber reinforcing layer is impregnated with a cyclic resin. The first and second reinforcing layers are brought into contact with one another. Heat is applied to the first and second reinforcing layers and causing the initiator to react with the cyclic resin. The initiator causes the ring-like structure on the cyclic resin to open. The open rings polymerize, crystallize and often cross-link with one another. The polymerization and cross-linking reaction forms a solid polymer about the first and second reinforcement layers. The polymer solidifies and forms an integral fiber reinforced article.

16 Claims, 2 Drawing Sheets

METHOD FOR MANUFACTURING A FIBER REINFORCED ARTICLE

BACKGROUND OF THE INVENTION

1. Field of the Invention

The present invention relates to a method of manufacturing a fiber reinforced article. More specifically, the invention relates to a method of manufacturing a fiber reinforced article made from two or more layers of fiber reinforcement, one layer being impregnated with an initiator and another layer being impregnated with a cyclic resin.

2. Description of the Related Art

It is known to manufacture a reinforced composite plastic article having a light weight core of foam surrounded by a fiber reinforced mat which is impregnated with a plastic resin. Molding methods that include injecting the resin to a fiber reinforced mat are commonly referred to as resin transfer molding (RTM). One difficulty with RTM relates to polymerization of the resin before it is fully injected into the fibrous mat. The resin is commonly mixed with an initiator which induces the resin to cross-link and polymerize. The cross-linking and polymerization solidifies the resin within the mat to form a solid rigid article. The initiator begins reacting with the resin before it completely wets the fibrous mat. The reacting resin becomes more viscous. The increasing viscosity of the resin slows the molding process and may cause portions of the fibrous mat to not receive resin. These portions of the fibrous mat that do not receive resin display an unfinished appearance and may potentially weaken the article's integrity.

Therefore, it is desirable to mix the initiator with the resin after the fibrous mat has been completely impregnated. It is most desirable to combine the initiator and resin within the perform so that the resin is allowed to completely impregnate the fibrous mat prior to polymerization.

It is known to manufacture resin in small ring-like structure. Such resins are called cyclic thermoplastics. An example of a cyclic thermoplastic resin as described in U.S. Pat. No. 5,039,783, issued 1991, D. J. Brunell and J. E. Brandt. These cyclic resins typically contain between two and ten carbons which form a ring-like structure. The resins when molten, have a very low viscosity approximately 7 centipoise and flow like water. The cyclic resins can typically use relatively low injection pressures and light-weight injection equipment. They are easily polymerized with an initiator. An initiator severs the ring structure and leaves the terminal portions of the open ring on the resin reactive. The terminal portions react with one another and form long chains having molecular weights between 50,000 and 200,000.

It is desirable to take advantage of these new cyclic thermoplastic resin materials to allow a resin which will ultimately form a high viscosity resin when fully reacted to impregnate the fibrous mat while its viscosity is still low before it mixes with an initiator. Initiators such as titanium tetra-alkoxides typically cause cross-linking and polymerization within 10–30 seconds.

SUMMARY OF THE INVENTION

The present invention relates to a method of manufacturing a fiber reinforced article. A first fiber reinforcing layer is impregnated with an initiator. A second fiber reinforcing layer is impregnated with a molten cyclic resin. The first and second reinforcing layers are brought into contact with one another, and the cross flow between layers during compression between the first and second reinforcing layers causes the initiator to mix with and react with the cyclic resin. The initiator causes the ring-like structure on the cyclic resin to open. The open rings polymerize, crystallize and cross-link with one another. The polymerization and cross-linking reaction forms a solid crystalline polymer about the first and second reinforcement layers. The polymer solidifies during the shaping operation and forms an integral fiber reinforced article.

It is possible to shape the article while the first and second reinforcing layers are still semi-pliable. Typically, the first fiber reinforcing layer having the initiator is contacted with the second reinforcing layer having a cyclic resin between heated rollers. The rollers transfer heat to the initiator and cyclic typically resin which begin to cross-link and polymerize. Before the polymerization is completed, the first and second reinforcing layers are positioned between matched metal dies and compression molded. The final polymerization and crystallization takes place within the dies and shapes the article in its final desired configuration.

These and other advantages, features and objects of the present invention will become more apparent to those of ordinary skill in the art upon reference to the following drawing and detailed description.

DETAILED DESCRIPTION OF THE PREFERRED EMBODIMENTS

Figure 1:
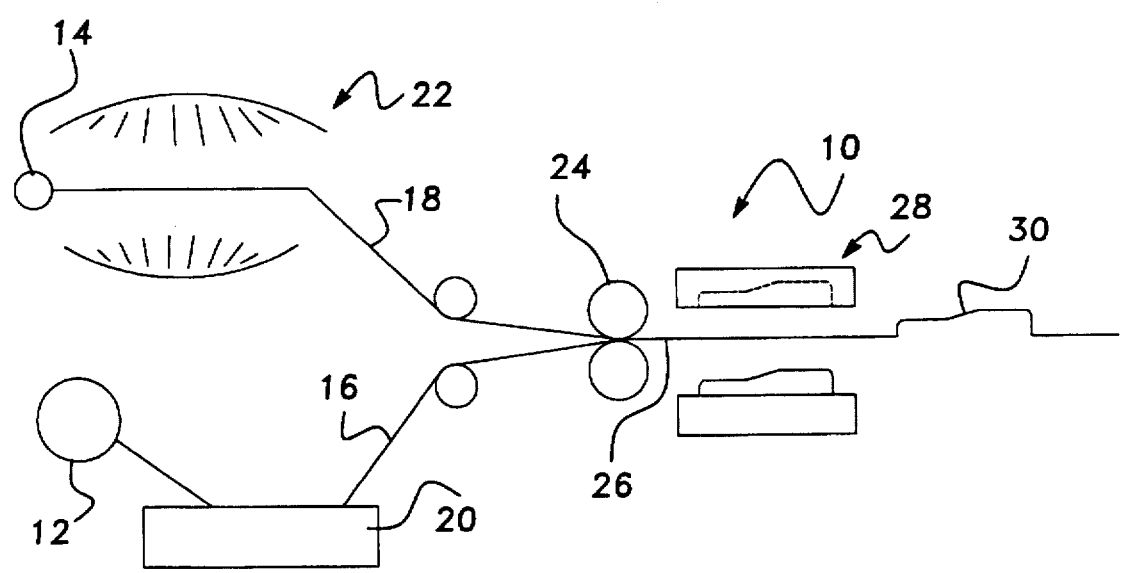
FIG. 1 is a schematic representation of an apparatus for practicing the present method.

Illustrated in FIG. 1 is an apparatus 10 for practicing the present invention. The apparatus 10 comprises roll feeders 12, 14. The roll feeder 12 dispenses a coiled roll of fiber reinforcement material that forms a first layer 16. The first layer 16 is generally made from a heavy long stand fibrous mat. The mat may be either woven, non-woven, braided or random orientation. Random oriented mats may be held together with resin or binder. Suitable fibrous materials include glass, carbon, arimid, and synthetic fibers such as polyester and polyamid. Synthetic fibers should be selected from materials that can withstand temperatures needed to initiate a reaction between the initiator and resin.

Roll feeder 14 dispenses a fibrous material that forms a second layer 18. The second layer 18 is generally made of lighter weight than the first layer 16 but may be selected from the same materials described above. The thickness and weight of the second layer 18 is generally determined by a structural application of the articles to be molded and by the amount of liquid that can be absorbed within the second layer 18. The weight and construction of this second layer are designed to deliver the correct ratio of initiator namely 1/100 of the resin content.

The first layer 16 is immersed within a resin bath 20. The resin bath 20 completely coats the first layer 16 with a cyclic thermoplastic resin. Suitable cyclic thermoplastic resins are described in U.S. Pat. No. 5,039,783, which is incorporated herein by reference. Of the available cyclic thermoplastic resins, polycarbonate, polyester, and polybutylene terepthylate (PBT), nylon and polyamid are preferred. Cyclic PBT has the lowest viscosity of this group and is especially preferable for wetting heavy weight fiber reinforcement material. The resin heated bath 20 generally has a viscosity of between 7–10 centipoise and is used to quickly impregnate the entire first layer 16 with resin by submerging it in the liquid.

The cyclic resin has a ring-like structure of between 2 and 10 carbon atoms. The cyclic resin is at its most fluid state when heated to between 165°–195° C. The cyclic resin requires an initiator to unlock the ring and to initiate a cross-linking and polymerization reaction. Heretofore, the initiator has been dispensed within the cyclic resin. However, this reaction tends to be very quick and begins forming a solid polymer as soon as the materials are mixed. Once the initiator mixes with the resin, the resin begins to build viscosity and does not completely wet the fiber reinforcement material using conventional impregnation methods.

To facilitate wetting the fiber reinforcement material with resin, it is useful to delay introduction of the initiator until after the reinforcement material has been completely wetted. The present invention dispenses a quantity of initiator onto the second layer 18. The initiator is dispensed onto the second layer 18 by means of a spray applicator 22, alternative application methods include dipping the mat in a bath or applying the initiator to a transfer roller. Fine droplets of initiator 22 wet the second layer 18. The initiator is selected from a group which causes the cyclic resin to unlock and cross-link. Suitable initiators are described in U.S. Pat. No. 5,039,783, and include both titinate based materials, both materials are low viscosity liquids at room temperature and are stable at the elevated processing temperatures. The invention has been described as immersing the first layer 16 and resin bath and dispensing initiator by a spray applicator. It is also possible to use a resin bath for the initiator and a spray applicator for the cyclic resin or to use a transfer roller.

The first layer 16 and second layer 18 are brought into close contact between rollers 24. The rollers 24 compress the first layer 16 and the second layer 18 so as to cause the initiator within the second layer 18 to blend with the cyclic resin in the first layer 16. The initiator causes the ring-like structure in the cyclic resin to open. The terminal ends of the open ring are highly reactive. The reactive ends link with one another to form long chains having a typical molecular weight between 50,000 and 200,000. The reaction is enhanced at temperatures above 160° C. Therefore, it is useful to heat the rollers 24 to maintain this elevated temperature so as to encourage the reaction between the initiator and cyclic resin. If however, a slower reaction is desired, the rollers 24 may be cooled to slow the reaction between the initiator and the cyclic resin. Additionally, the resin and initiator may be separately heated to increase the viscosity of the materials. It is also possible to heat the initiator or cyclic resin to bring the materials up to the desired temperature for cross-linking. Grooves or teeth may be added to rollers 24 to enhance inter penetration of the two sheets.

A laminated sheet 26 contains both the heavy-weight first layer 16 and lighter weight second layer 18. The cross-linked resin polymer encases both the first layer 16 and the second layer 18 to form an integral laminated sheet 26. The laminated sheet 26 may be at least partially pliable and hot as it exits the rollers 24 because the initiator and cyclic resin have not completely cross-linked and polymerized. While the laminated sheet 26 is in this partially pliable state, it is useful to mold the laminated sheet into its final desired configuration. The laminated sheet 26 is dispensed between matched metal dies 28. Dies 28 are shaped to form an article from the laminated sheet. Dies 28 are moveable between an open and closed position. The laminated sheet is placed between the dies when the dies are in their open position and formed the laminated sheet 26 into article 30 when the dies are closed. Dies 28 may be heated to additionally aid in polymerizing and crystallizing the laminated sheet 26.

In place of the dies 28, the laminated sheet 26 may be formed into tubes, channels, and beams through an extruder (not shown). Alternatively, yet another pair of rollers may impart a texture or pattern to the laminated sheet 26. The laminated sheet 26 may be segmented into smaller sheets to aid later stamping processes. Tubes of the laminated sheet could be inserted in a mold and blow molded to final shape as could a 2 sheet stacks as described below.

The invention has been described and illustrated as a method of making a two-layer molded article. Additional layers are possible by combining stacked alternating stacks of reinforcement material having initiator and cyclic resin. The invention has also been illustrated as a continuous line from the roll feeders 12, 14 through to article 30. The invention may be practiced in discrete stages. The first and second layers 16, 18 maybe formed in one operation, rolled or cut into shells and then stored for subsequent processing. Additionally, the joined layers 16, 18 maybe cut into sheets for subsequent molding.

The first and second layers 16, 18 maybe completely wetted with initiator and resin and coiled. The coil may then be substantially brought together in a separate operation. Finally, the molding operation maybe compression molding, pinch rolling, stamping, extrusion, blow molding stamping or hydro forming.

Figure 2:
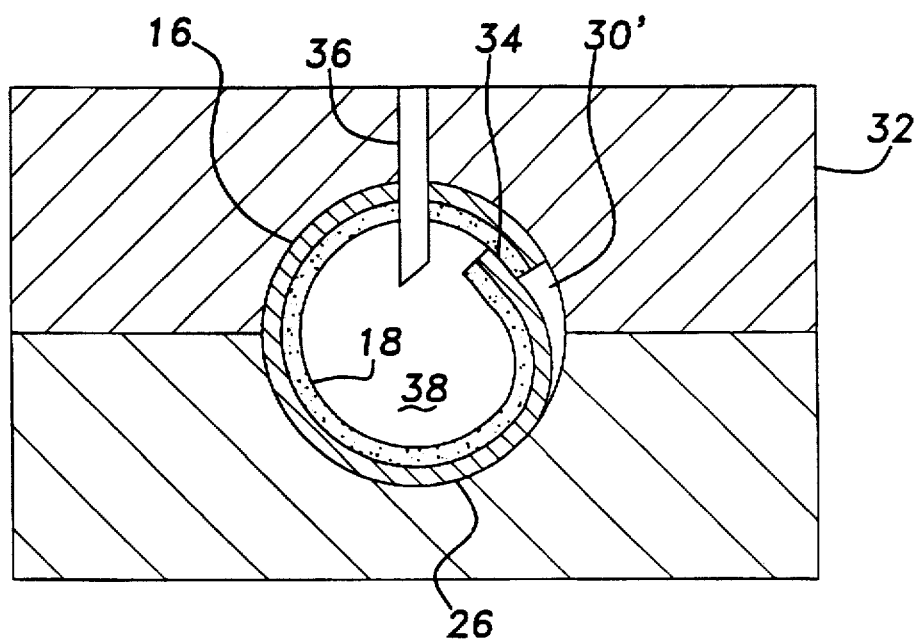
FIG. 2 is an alternative embodiment of the present invention showing a cross-sectional view of a blow-molding apparatus.

FIG. 2 is an alternative embodiment of the present invention. In place of the stamping dies 28, a blow-molding apparatus 32 forms the laminated sheet 26 into a blow-molded article 30'. The laminated sheet 26 includes a first layer 16 overlying and juxtaposed a second layer 18. The sheet 26 is rolled into a tube-shape and a portion of the ends are over-lapped at area 34. The area 34 includes a portion of the first layer 16 disposed between two portions of the second layer 18. The over-lap area 34 forms a continuous seam between the ends of sheet 26. A blow-pin 36 may be used to inject an inflation gas within a hollow portion 38 of article 30'. The inflation gas causes the first and second layers 16, 18 to be brought into close contact. The first layer 16 and the second layer 18 are urged together so as to cause the initiator within the second layer 18 to blend with the cyclic resin in the first layer 16. The first and second layers 16, 18 react with the adjacent layer to form an integral seam between the ends at area 34. The initiator and cyclic resin may be heated to their preferred reaction temperature either by injecting a pre-heated inflation gas through blow-pin 36, or alternatively by heating blow-molding apparatus 32. A hollow rigid article 30', conforming to the shape of the apparatus 32 is formed and removed from the apparatus 32.

It should be emphasized that the present invention is not limited to any particular components, material or configurations described and that modifications of the invention will be apparent to those skilled in the art in light of the foregoing description. This description is intended to provide specific examples of individual embodiments which clearly disclose the present invention. Accordingly, the invention is not limited to these embodiments or to the use of elements having the specific configurations and shapes presented herein. All alternative modifications and variations of the present which fall within the spirit and broad scope of the appending claims are included.

What is claimed is:

1. A method of manufacturing a fiber reinforced article comprising the steps of:

impregnating a first fiber reinforcing layer with an initiator;

impregnating a second fiber reinforcing layer with a molten cyclic resin;

contacting said first and second reinforcing layers; heating said first and second reinforcing layers while said initiator reacts with said cyclic resin and to open the ring-like structure on said cyclic resin and to cause said open rings to polymerize and cross-link, said polymerization and cross-linking forms a pliable thermoplastic, and subsequent to said heating step, molding said article into a desired shape while said thermoplastic is still warm and pliable, whereby said thermoplastic impregnates and completely wets the first and second fiber reinforcing layers to form said article.

2. The method of claim 1, wherein said contacting step occurs by placing said first and second reinforcing sheets between a pair of rollers.

3. The method of claim 2, wherein said rollers are heated and said heated rollers cause said initiator and cyclic resin to heat.

4. The method of claim 1, wherein said first and second reinforcing layer is made from long strand fibers.

5. The method of claim 4, wherein said fibers are selected from the group consisting of glass, carbon, arimid, and high temperature synthetic polymers.

6. The method of claim 4, wherein said fibers are selected from the group consisting of polyester and polyamid.

7. The method of claim 6, wherein said fibers have a melting point greater than the temperature needed to react said initiator and cyclic resin.

8. The method of claim 1, wherein said cyclic resin is selected from the group consistanting of polycarbonate, polyester, nylon, polyamid and polybutylene terethylate.

9. The method of claim 1, wherein said initiator is selected from the group consisting of titinate compounds.

10. The method of claim 1, wherein said initiator and cyclic resin are heated to between 165°–195° C.

11. The method of claim 1, wherein said article is compressed between two matched dies into a desired shape.

12. The method of claim 1, where said impregnating step comprises spraying at least one of said initiator or cyclic resin on said reinforcing layers.

13. The method of claim 1, where said impregnating step comprises immersing at least one of said first or second reinforcing layers in said initiator or cyclic resin.

14. A method of manufacturing a molded fiber reinforced article comprising the steps of:

impregnating a first pliable fiber reinforcing layer with an initiator;

impregnating a second pliable fiber reinforcing layer with a cyclic resin;

contacting said first and second reinforcing layers between heated rollers and causing said initiator and cyclic resin to heat to a temperature sufficient to react said initiator and said cyclic resin;

reacting said initiator with said cyclic resin and causing the ring-like structure on said cyclic resin to open and polymerize and cross-link, said polymerization and cross-linking forming a pliable thermoplastic that completely wets said first and second fiber reinforcing layers; and subsequent to said reacting step, compressing said reacted first and second layers between two matched dies into a desired shape while said thermoplastic is still warm and pliable to form said article.

15. The method of claim 14, wherein at least one of said first or second fiber layer is made from fibers selected from the group consisting of glass, carbon, arimid, polyester and polyamid.

16. The method of claim 14, wherein said cyclic resin is selected from the group consisting of polycarbonate, polyester, nylon, polyamid and polybuylene terethylate.

* * * * *